United States Patent [19]

Lake

[11] Patent Number: 5,624,468
[45] Date of Patent: Apr. 29, 1997

[54] METHOD FOR FABRICATING A LEADLESS BATTERY EMPLOYING AN ALKALI METAL ANODE AND POLYMER FILM INKS

[75] Inventor: Rickie C. Lake, Boise, Id.

[73] Assignee: Micron Technology, Inc., Boise, Id.

[21] Appl. No.: 71,463

[22] Filed: Jun. 2, 1993

[51] Int. Cl.$^6$ .............................. H01M 4/08; H01M 6/46
[52] U.S. Cl. ........................ 29/623.5; 29/623.4; 429/162
[58] Field of Search ................................ 429/127, 192, 429/162, 218; 29/623.1, 623.4, 623.5

[56] References Cited

U.S. PATENT DOCUMENTS

| | | | |
|---|---|---|---|
| 4,125,684 | 11/1978 | Land | 429/162 X |
| 4,172,319 | 10/1979 | Bloom et al. | 429/162 X |
| 4,177,552 | 12/1979 | Gordon et al. | 29/623.4 |
| 4,621,035 | 11/1986 | Bruder | 429/152 |
| 4,888,206 | 12/1989 | Hope et al. | 427/57 |
| 4,911,995 | 5/1990 | Belanger et al. | 429/192 |
| 4,935,317 | 6/1990 | Fauteux et al. | 29/623.5 X |
| 5,080,932 | 1/1992 | Koksbang et al. | 427/209 |
| 5,169,446 | 12/1992 | Koksbang et al. | 118/69 |

*Primary Examiner*—John S. Maples
*Attorney, Agent, or Firm*—Wells, St. John, Roberts, Gregory & Matkin, P.S.

[57] ABSTRACT

A package and method for fabricating a battery is disclosed. According to the method a first base, preferably comprising a polyester, is provided and a first slot is made thereon. Next, a first conductive thick film ink is printed superjacent the first base which is subsequently cured to form a first conductive layer. Subsequently, a cathode layer is formed superjacent the first conductive layer and the combination is subsequently cured. An electrolyte layer is then formed superjacent the cathode layer, which is subsequently cured to complete the first base. A second base, preferably comprising a polyester, is then provided and a second slot is made thereon. Subsequently, a second conductive thick film ink is printed superjacent the second base which is then cured to form a second conductive layer. Next, a molten alkali metal is fused to the second conductive layer and allowed to solidify and cool. This completes fabrication of the second base. Once both first and second bases are completed, they are properly aligned such that the first pad is exposed through the second slot, and the second pad is exposed through the first slot. Thus, direct electrical contact can be made to both the first and second conductive layers by means of both pads through both slots.

4 Claims, 9 Drawing Sheets

(KNOWN ART)

(KNOWN ART)

(KNOWN ART)

(KNOWN ART)

(KNOWN ART)

(KNOWN ART)

(KNOWN ART)

METHOD FOR FABRICATING A LEADLESS BATTERY EMPLOYING AN ALKALI METAL ANODE AND POLYMER FILM INKS

CROSS REFERENCE TO RELATED APPLICATIONS

This application is related to copending application (Ser. No. 008,529) filed Jan. 23, 1993, commonly assigned with the present invention.

FIELD OF THE INVENTION

The present invention relates generally to a process for fabricating a battery cell. More particularly, the present invention teaches a method for manufacturing a thin leadless battery employing an alkali metal anode and polymer thick film inks.

BACKGROUND OF THE INVENTION

Advancements in semiconductor technology have led to the production of large scale integrated circuits which have revolutionized the electronics industry. Microelectronic components are now widely used in the production of a variety of electronic devices, such as portable computers, calculators, watches, cordless telephones, radios, tape recorders, and security systems. Development of such electronic devices has brought about the evolution of batteries as miniature power supplies. In light of their applications, this new generation of batteries must produce higher energy per unit volume and superior discharge characteristics.

The technology related to thin solid state batteries has been developing at a rapid pace. Thin solid state batteries are typically fabricated employing an alkali metal anode, a non-aqueous electrolyte, and cathodes of nonstoichiometric compounds, such as teachings of U.S. Pat. No. 4,621,035, 4,888,206, 4,911,995, 5,169,446, and 5,080,932. Of the alkali metals commercially feasible in manufacturing the anode material, lithium is preferred because it has a low atomic weight, while having a high electronegativity. These thin batteries require a high energy density, a long shelf life and efficient operation over a wide range of temperatures.

One known method for fabricating a thin battery cell is shown in FIG. 1. Referring to FIG. 1(a), a current collector film is initially provided. The collector film can comprise a variety of conductive materials, including but not limited to stainless steel, copper, nickel or aluminum. Subsequently, an cathode is positioned superjacent the current collector film preferably by extrusion, as shown in FIG. 1(b). This step also involves curing to sufficiently polymerize the cathode. Referring to FIG. 1(c), after the cathode is cured, an electrolyte layer is positioned superjacent the cathode and subsequently cured. Next, from the current collector-cathode-electrolyte sandwich, a multitude of die are cut into half cells, referring to FIG. 1(d). Then, each die has an anode foil comprising lithium or some other suitable alkali positioned superjacent, as illustrated in FIG. 1(e). Referring to FIG. 1(f), a second conductive layer is subsequently positioned superjacent the lithium anode. Each die, referring to FIG. 1(g), is then packaged in a stainless steel enclosure such that one current collector is in electrical contact with the top portion of the stainless steel enclosure and the other collector is in contact with the bottom portion of the enclosure. To ensure against potential shorting, insulation is positioned within the enclosure between the anode and the cathode leads, and the top and bottom portions of the stainless steel enclosure. Previously, thin battery manufacturing technology has relied on forming and assembling the anode, electrolyte, and cathode of the battery as separate components. However, this is a relatively labor intensive procedure that involves the intricate assembly of a number of discrete components. The stamping and handling of individual discs of lithium is particularly costly and difficult to achieve because of the expense that lithium poses and its relatively high reactivity. Thin lithium foil comprises malleable, low tensile strength properties. Moreover, lithium foil adheres to a large number of other materials. As such, lithium foil is difficult to employ in the manufacture of batteries.

In light of these shortcomings, there have been several developments in the manufacturing processes of thin battery technology. These advancements, such as U.S. Pat. No. 4,911,995, and U.S. Pat. No. 4,621,035, have relied on the utilization of a thin metal film as a metalization layer. This metalization layer is then employed with an alkali metal to form an anode. However, these approaches fail to provide a battery which has the flexibility and durability required in some electronics applications, as well as a simplified means for manufacturing.

Polymer thick film inks have yet to be examined as a conductive layer from which a lithium anode may be formed. Many of the difficulties in manufacturing polymer batteries are related to handling and assembling the lithium anodes, the cathodic polymers and the electrolytic polymers. These issues are compounded in part because most techniques in the known art for fabricating these battery types involve forming one battery cell at a time.

SUMMARY OF THE INVENTION

The primary object of the present invention is to eliminate the aforementioned drawbacks of the prior art.

It is another object of the present invention to provide a method for fabricating a low cost, light weight, thin, extremely flexible battery cell.

It is yet another object of the present invention to provide a method for fabricating a battery cell having increased durability and wear resistance.

Still another object of the present invention is to provide a method for fabricating a battery cell having an improved packaging thereby eliminating the need for power leads.

In order to achieve these hereinabove objects, as well as others which will become apparent hereafter, a method is disclosed for fabricating a leadless battery cell employing both conductive polymer thick film inks and molten lithium. The thick film inks can be printed onto a suitable substrate, rigid or flexible, such as glass, ceramics, and/or polymer films, and subsequently coated with molten lithium for use as an anode in lieu of using lithium foil or roll bonding lithium foil or applying molten lithium to solid metal foils such as copper, nickel or stainless steel. Molten lithium would then be applied in a very thin layer onto the cured polymer thick film ink. In the preferred embodiment, the battery employs a leadless package by integrating conductive polymer thick film ink printing process. The battery contact pads could be capped with a carbon based thick film ink for wear resistance and increased durability. Nonetheless, in an alternate embodiment, the battery also could comprise leads by directly attaching lead wires.

Thus, the present inventive method for fabricating a battery cell without leads involves several steps. According to the method a first base, preferably comprising a polyester, is provided. Second, a first slot or void is made in the first base. Third, a first conductive thick film ink is printed superjacent the first base and the combination is subsequently cured to form a first conductive layer. Fourth, a first conductive thick film ink pad is printed superjacent first conductive layer to ultimately form an electrical contact and the combination is subsequently cured to form a first conductive pad. Fifth, a carbon ink layer is printed superjacent the first conductive pad to provide increased wear resistance and improved durability. Sixth, a cathode layer is formed superjacent the first conductive layer and the combination is subsequently cured. Seventh, an electrolyte layer is formed superjacent the cathode layer and the combination is subsequently cured. This completes fabrication of the first base. It should be obvious to one of ordinary skill in the art that other process sequences may be used to obtain the same results.

With regards to the second base, initially, a second base, preferably comprising a polyester, is provided. Second, a second void is made in the second base. Third, a second conductive thick film ink is printed superjacent the second base and the combination is subsequently cured to form a second conductive layer. Fourth, a second conductive thick film ink pad is printed superjacent the first conductive layer to ultimately form an electrical contact and the combination is subsequently cured to form a second conductive pad. Fifth, a carbon ink layer is printed superjacent the second conductive pad to provide increased wear resistance and improved durability. Sixth, a molten alkali metal is fused to the second conductive layer and allowed to solidify and cool. This completes fabrication of the second base. It should be obvious to one of ordinary skill in the art that other process sequences may be used to obtain the same results.

Once both first and second bases are completed, they are properly aligned such that the first pad is exposed through the second slot, and the second pad is exposed through the first slot. Thus, by proper alignment, direct electrical contact can be made to both the first and second conductive layers by means of both pads through both slots. It should be obvious to one of ordinary skill in the art that base and conductive layers could be modified with electrical contact holes so that electrical contacts are through one provided on the same side of the package base.

The thick film inks employed in the present inventive method can be standard thick film ink, polymer thick film ink, or high temperature thick film ink. This selection is dependent on the choice for substrate base material. Standard or high temperature thick film ink should be utilized with a ceramic substrate base material. Furthermore, the curing steps involved can be accomplished by means of heat, ultra violet light, infrared light, or electron beam energy. As the choice of means is dependent on the type of thick film ink selected, it should be obvious to one of ordinary skill in the art that the temperature employed in order to complete the step of curing is dependent on the length of heating, as well as the thickness of the film. For example, a polymer thick film ink can be cured for approximately 60 seconds to 30 minutes at substantially 130° C. to 165° C.

Other objects and advantages will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 1A:
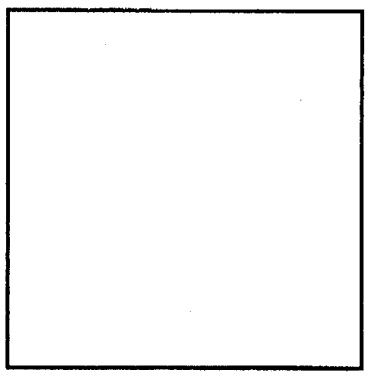
FIG. 1(a)–(g) are planar views of a known method for fabricating a battery cell.
Figure 1B:
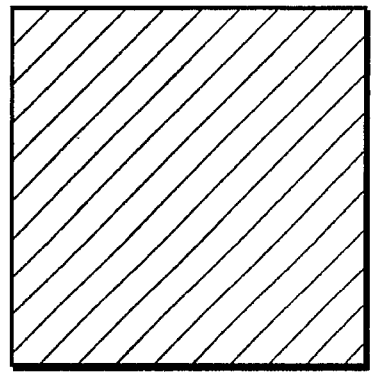
Figure 1C:
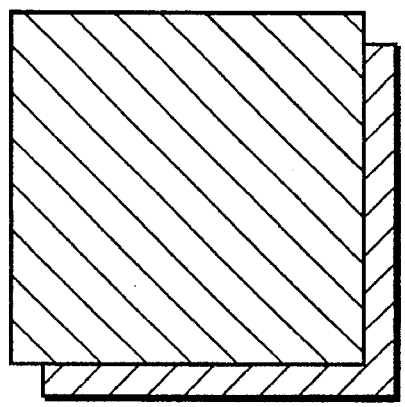
Figure 1D:
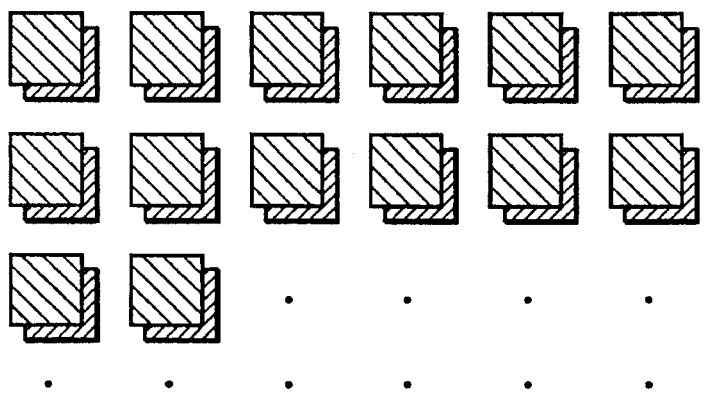
Figure 1E:
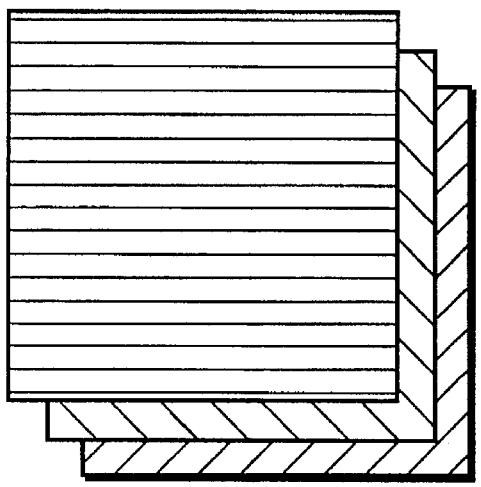
Figure 1F:
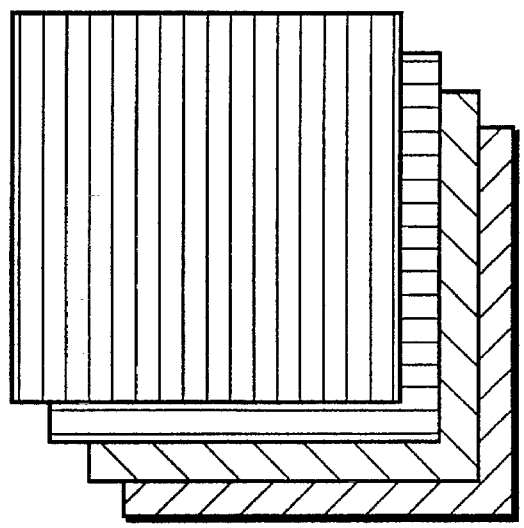
Figure 1G:
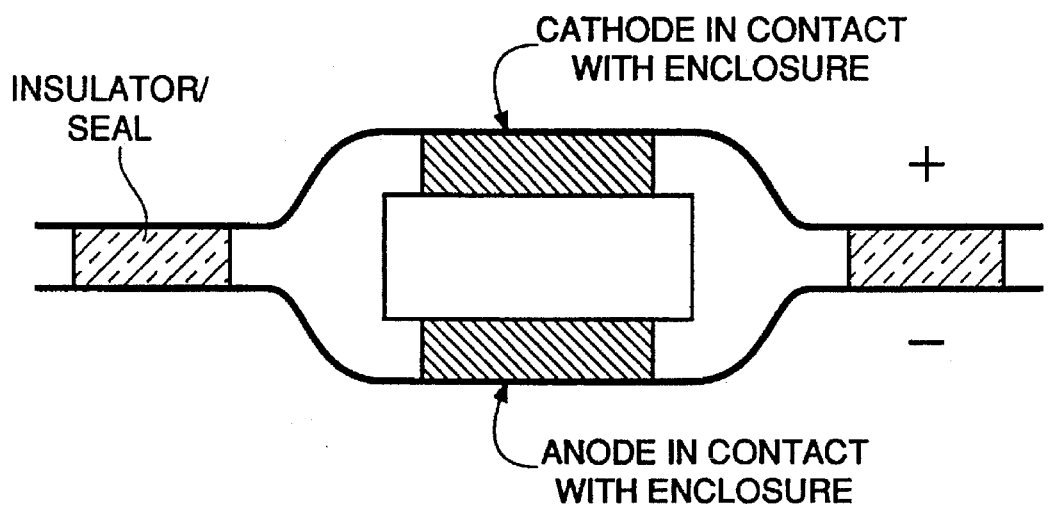
Figure 2A:
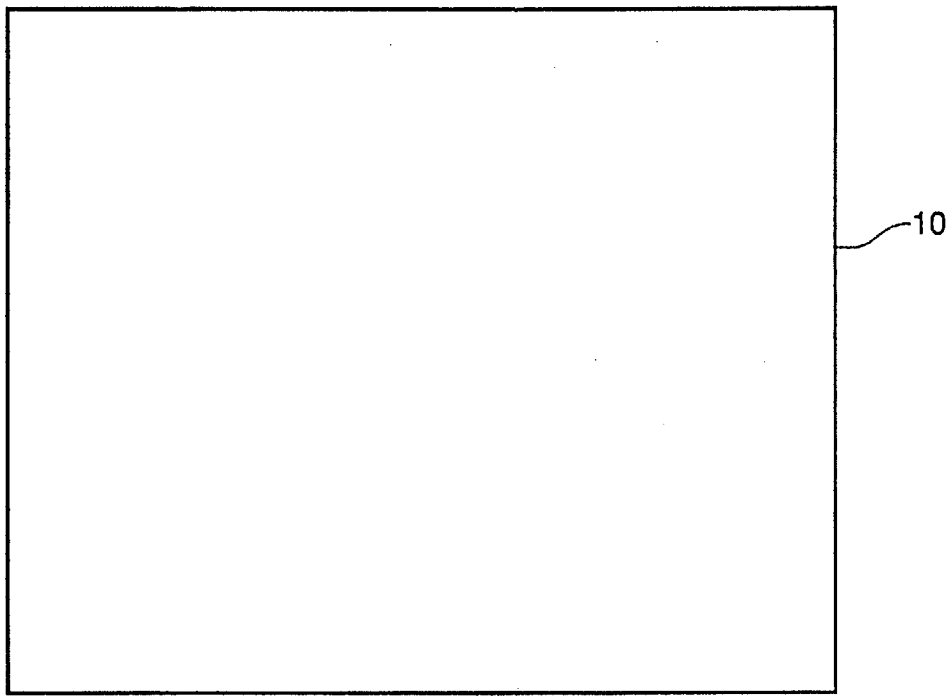
FIG. 2(a)–(f) are planar views of a first base undergoing the steps of the present invention.

Referring to FIG. 2(a), a non-conductive first base 10 is shown prior to undergoing the present inventive method. First base 10 preferably comprises polyester, though glass, ceramics, or other polymer films can also be employed. Optimally, first base 10 is a very elastic material to provide the resultant battery cell structure with a great deal of flexibility. Moreover, first base 10 preferably comprises an adhesive (not shown) on its surface or outer perimeter to allow it to be adjoined with a second base upon completion of the present inventive method. However, a variety of techniques for adjoining two bases are known, and as such, one of ordinary skill in the art could easily device an alternate method to accomplish this final step.

Figure 2B:
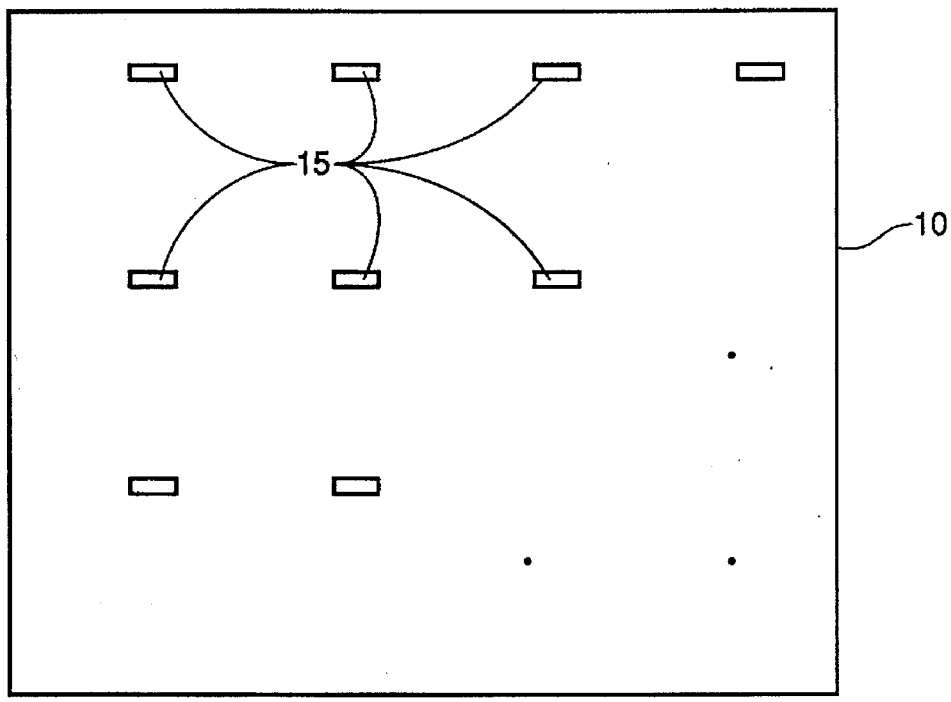

Upon providing first base 10, a first void or slot 15 is made through first base 10, as illustrated in FIG. 2(b). Slot 15 provides an electrical access area to the eventually formed anode. Slot 15 is punched out or extruded from first base 10. A variety of alternate techniques for making a hole in first base 10 are known to one of ordinary skill in the art, and thus, are not described in detail.

Figure 2C:
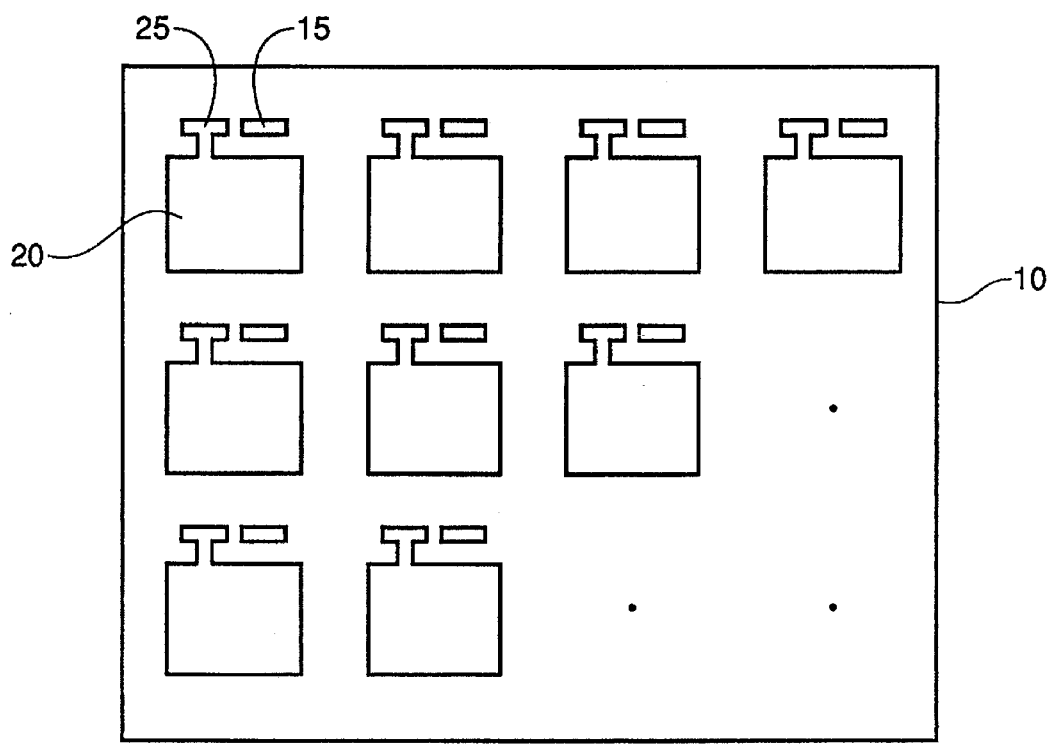

Referring to FIG. 2(c), a first conductive layer 20 is depicted superjacent first base 10 and aligned adjacent to first slot 15. First conductive layer 20 preferably comprises conductive polymer thick film ink. However, standard thick film ink, and high temperature thick film ink can also be used, though such use is dependent on the material selected for first base 10. First conductive layer 20 serves the same functional purposes as the current collector of the known art. However, because its formation employs conductive ink technologies, it provides much greater flexibility.

The fabrication of first conductive layer 20 superjacent first base 10 involves two independent steps. Initially, first conductive layer 20, in the liquid ink form, is printed directly superjacent first base 10. Subsequently, first base 10, having the thick film ink printed, is cured. This curing step can be accomplished through a variety of means, including the direct application of heat, ultra violet light, infrared light, and electron beam energy, the choice of which is dependent on the type of thick film ink selected. As the choice of means is dependent on the type of thick film ink selected, it should be obvious to one of ordinary skill in the art that the temperature employed in order to complete the step of curing is dependent on the length of heating, as well as the thickness of the film. For example, a polymer thick film ink can be cured for approximately 60 seconds to 30 minutes at substantially 130° C. to 165° C.

In the preferred embodiment of the present invention, first conductive layer 20 comprises a first pad area 25, as both are printed, cured and formed simultaneously. Nevertheless, under certain circumstances, first pad 25 may be formed after first conductive layer 20 is cured. In that situation, the polymer thick film ink selected is printed to form first pad 25 in electrical contact with first conductive layer 20. Subsequently, first pad 25 is cured using the techniques described hereinabove.

Figure 2D:
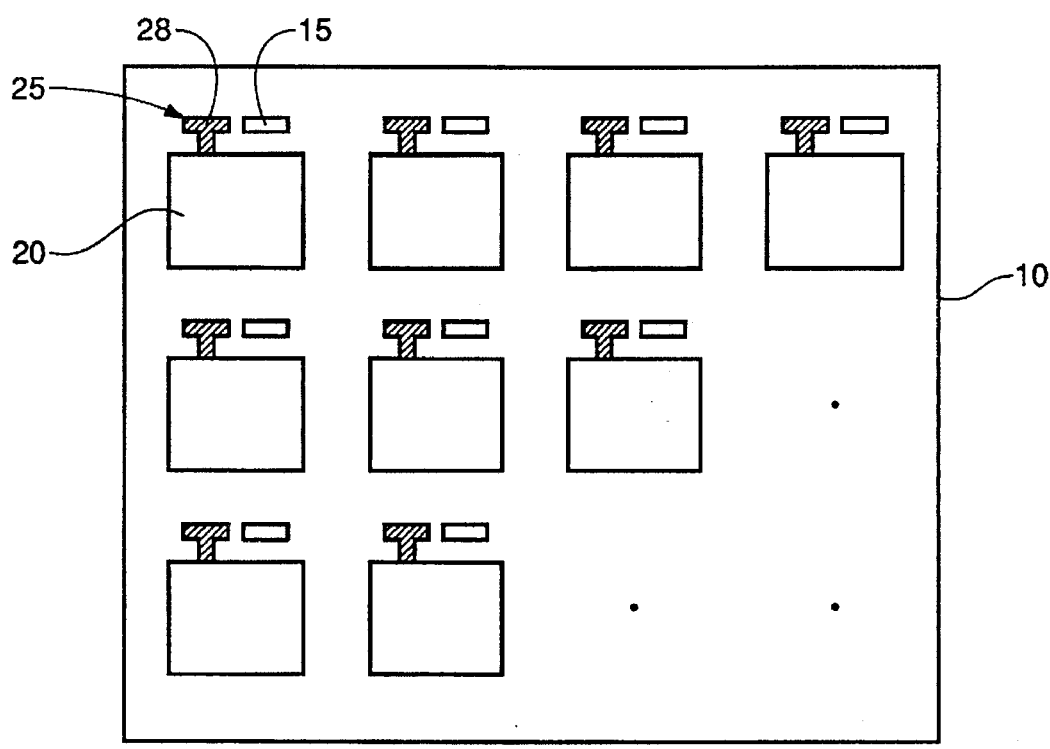

In one embodiment of the present invention, capped tip 28 is printed superjacent first pad 25, as shown FIG. 2(d). Tip 28 is formed by printing carbon based polymer thick film ink directly onto a portion of first pad 25, and subsequently curing the combination using the techniques described hereinabove. By employing capped tip 28 of the present invention, the first contact has increased wear resistance and improved durability.

Figure 2E:
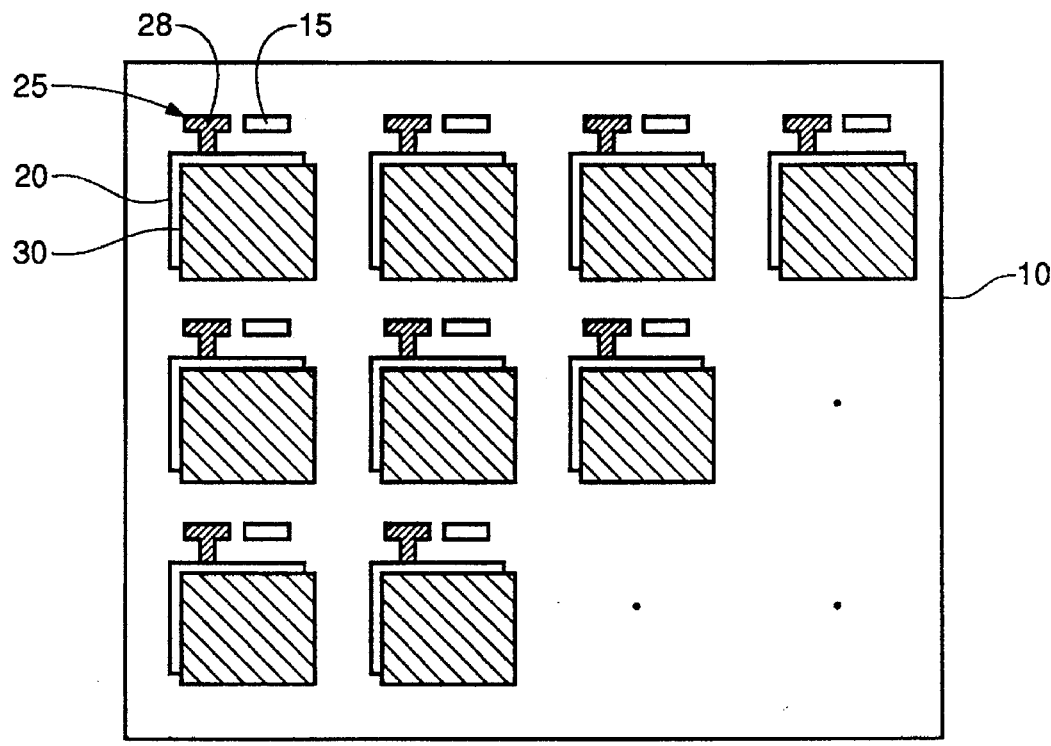

Referring to FIG. 2(e), a cathode 30 is formed superjacent first conductive layer 20. Cathode 30 preferably comprises a conductive liquid or paste suitable for screen or stencil printing. The cathode material selected can comprise a variety of chemistries, including manganese, cobalt, $MnO_2$, and $V_6O_{13}$, as well as other similar materials obvious to one of ordinary skill in the art.

Cathode 30 is fabricated superjacent first conductive layer 20 by two independent steps. Initially, cathode 30, in liquid or paste form, is formed directly superjacent first conductive layer 20. Subsequently, the portion of cathode, superjacent first conductive layer 20 is cured. This curing step is accomplished using the techniques described hereinabove.

Figure 2F:
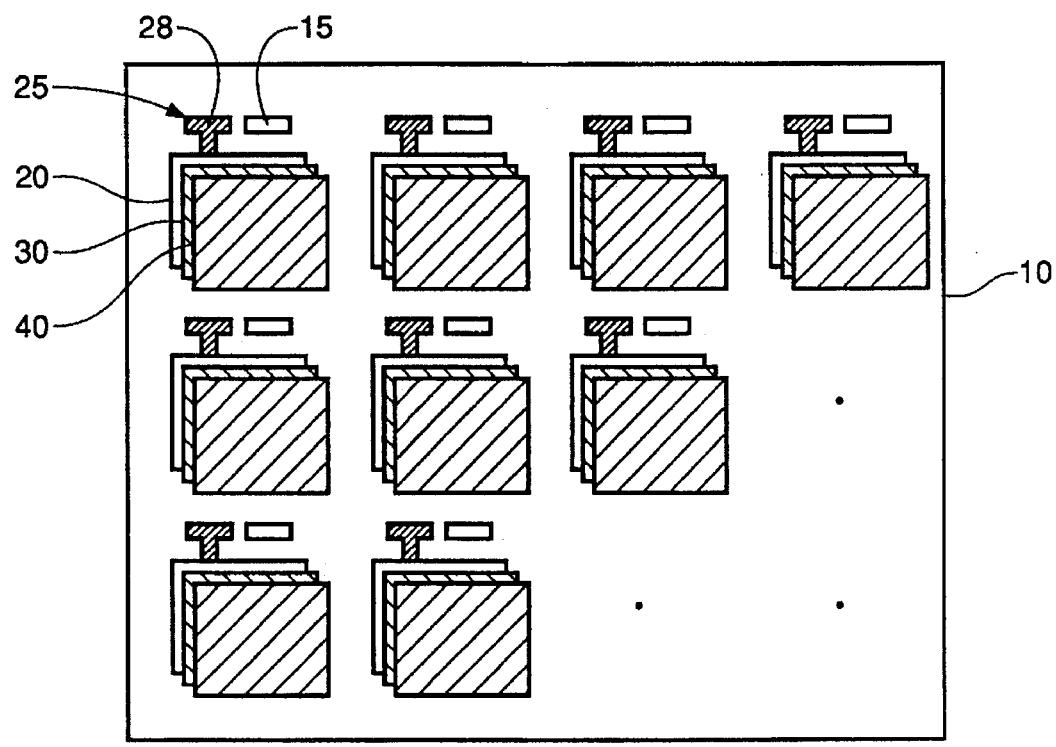

Referring to FIG. 2(f), a electrolyte film 40 is formed superjacent cathode 30. Electrolyte film 40 preferably comprises a liquid or paste suitable for screen or stencil printing. The selection of material for electrolyte film 40 is dependent on the chemistry of materials employed in fabricating cathode 30.

Electrolyte film 40 is fabricated superjacent cathode 30 by two independent steps. Initially, electrolyte film 40, in the liquid or paste form, is formed directly superjacent cathode 30. Subsequently, the portion of electrolyte film 40 superjacent cathode 30 is cured. This curing step is accomplished using the techniques described hereinabove. Once electrolyte film 40 is cured, first base 10 of the battery cell is complete. Other methods for applying electrolyte film, including the placement of a sheet of electrolyte film superjacent cathode 30 or superjacent an anode layer, are equally employable to achieve the benefits of the present inventive method.

Figure 3A:
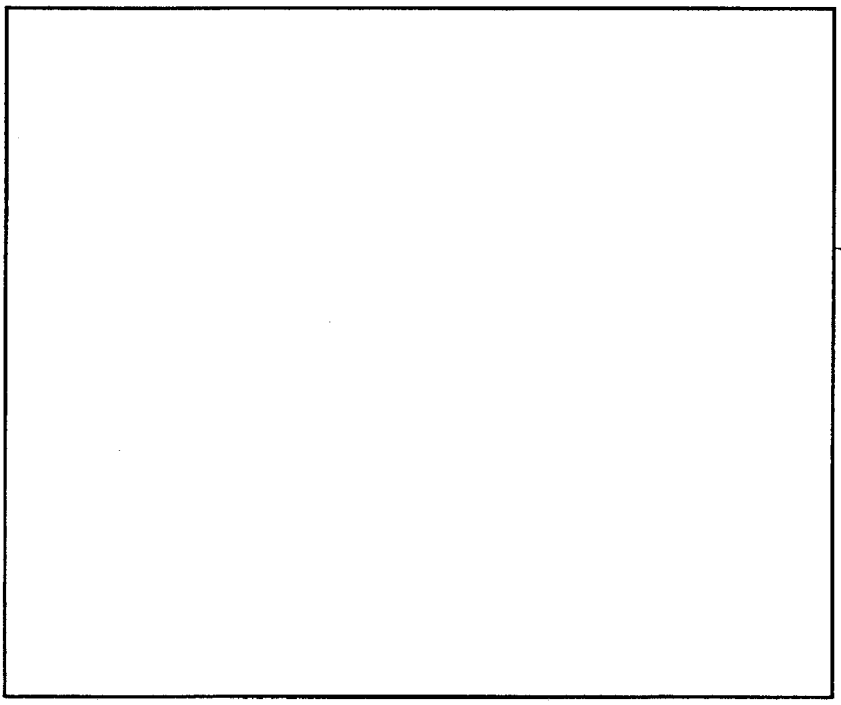
FIG. 3(a)–(e) are planar views of a second base undergoing the steps of the present invention.

Referring to FIG. 3(a), a non-conductive second base 50 is shown prior to undergoing the present inventive method. Second base 50 preferably comprises polyester, though glass, ceramics, or other polymer films can also be employed. Optimally, second base 50 is a very elastic material to provide the resultant battery cell structure with a great deal of flexibility. While first base 10 and second base 50 are formed independently, several of the steps necessary to complete these bases are identical. As such, both first base 10 and second base 50 can be fabricated simultaneously from the same base material.

Moreover, second base 50 preferably comprises an adhesive (not shown) on its surface or outer perimeter to allow it to be adjoined with first base 10 upon completion of the present inventive method. A variety of alternate techniques for adjoining two bases are known, and as such, one of ordinary skill in the art could easily choose an alternate method to accomplish this final step.

Figure 3B:
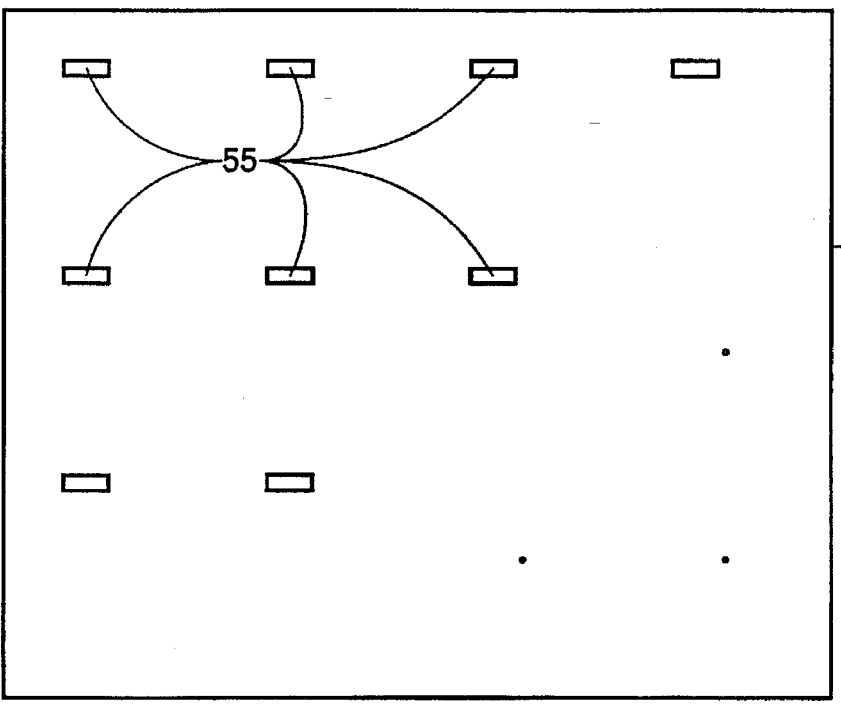

Upon providing second base 50, a second void or slot 55 is made through second base 10, as illustrated in FIG. 3(b).

Slot 55 provides an electrical access area to cathode 30, after first bases 10 and second base 50 are adjoined. Slot 55 is punched out or extruded from second base 50. A variety of alternate techniques for making a hole in second base 50 are known to one of ordinary skill in the art, and thus are described in detail.

Figure 3C:
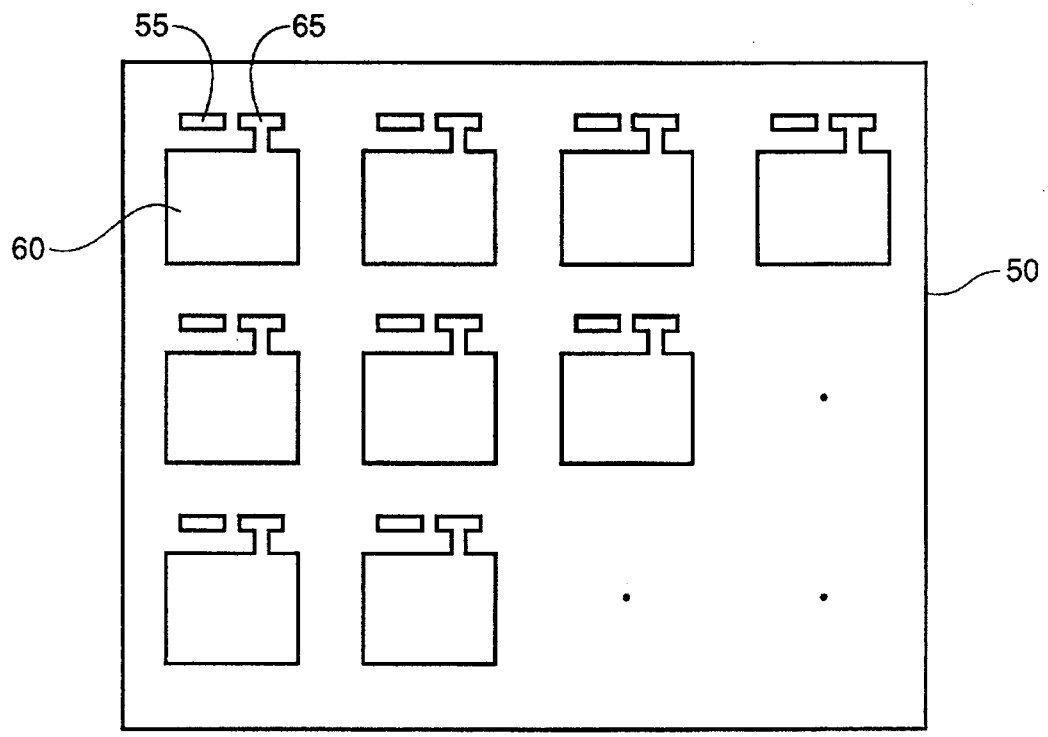

Referring to FIG. 3(c), a second conductive layer 60 is depicted superjacent second base 50 and aligned adjacent to second slot 55. Second conductive layer 60 preferably comprises conductive polymer thick film ink. However, standard thick film ink, and high temperature thick film ink can also be used, though such use is dependent on the material selected for first base 10. Second conductive layer 60 serves as a terminal and as a metal bearing polymer to which a lithium anode will ultimately be formed.

The fabrication of second conductive layer 60 superjacent second base 50 involves two independent steps. Initially, second conductive layer 60, in the liquid ink form, is printed directly superjacent second base 50. Subsequently, second base 50, having the thick film ink printed, is cured. This curing step can be accomplished through a variety of means, including the direct application of heat, ultra violet light, infrared light, and electron beam energy. The choice of means is dependent the type of thick film ink selected.

In the preferred embodiment of the present invention, second conductive layer 60 comprises a second pad area 65, as both are printed, cured and formed simultaneously. Nevertheless, under certain circumstances, second pad 65 may be formed after second conductive layer 60 is cured. In that situation, the polymer thick film ink selected is printed to form second pad 65 in electrical contact with second conductive layer 60. Subsequently, pad 65 is cured using the techniques described hereinabove.

Figure 3D:
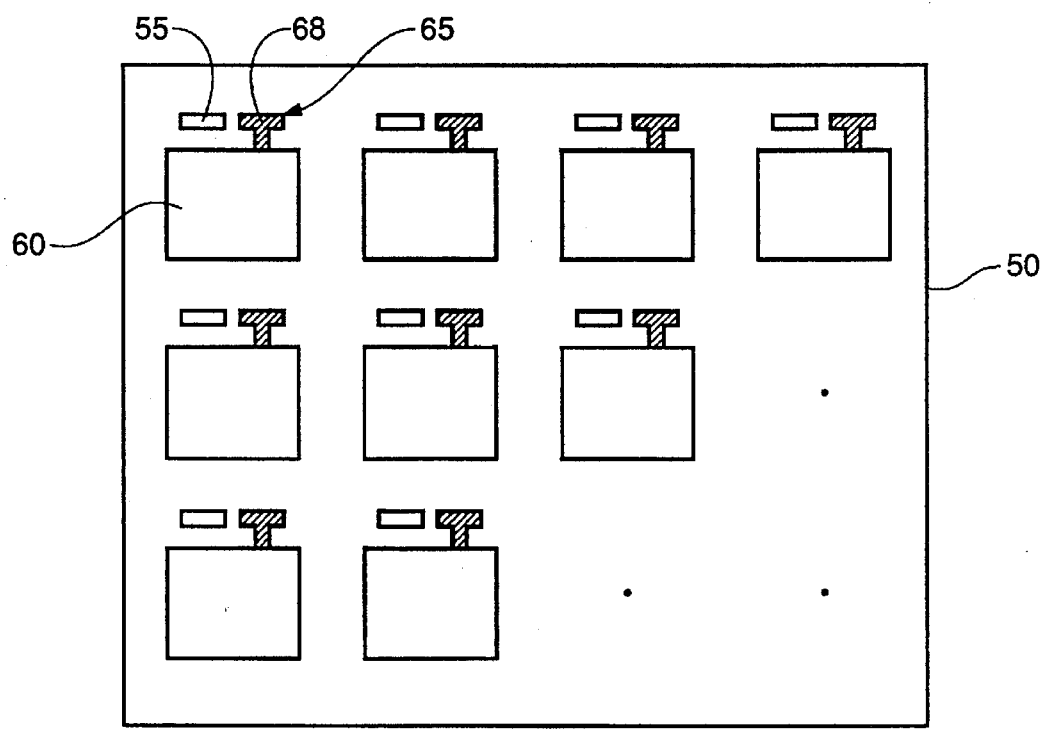

In one embodiment of the present invention, capped tip 68 is printed superjacent second pad 65 as shown FIG. 3(d). Tip 68 is formed by printing carbon based polymer thick film ink directly onto a portion of second pad 65, and subsequently curing the combination using the techniques described hereinabove. By employing capped tip 68 at the present invention, the first contact should have increased wear resistance and improved durability.

Figure 3E:
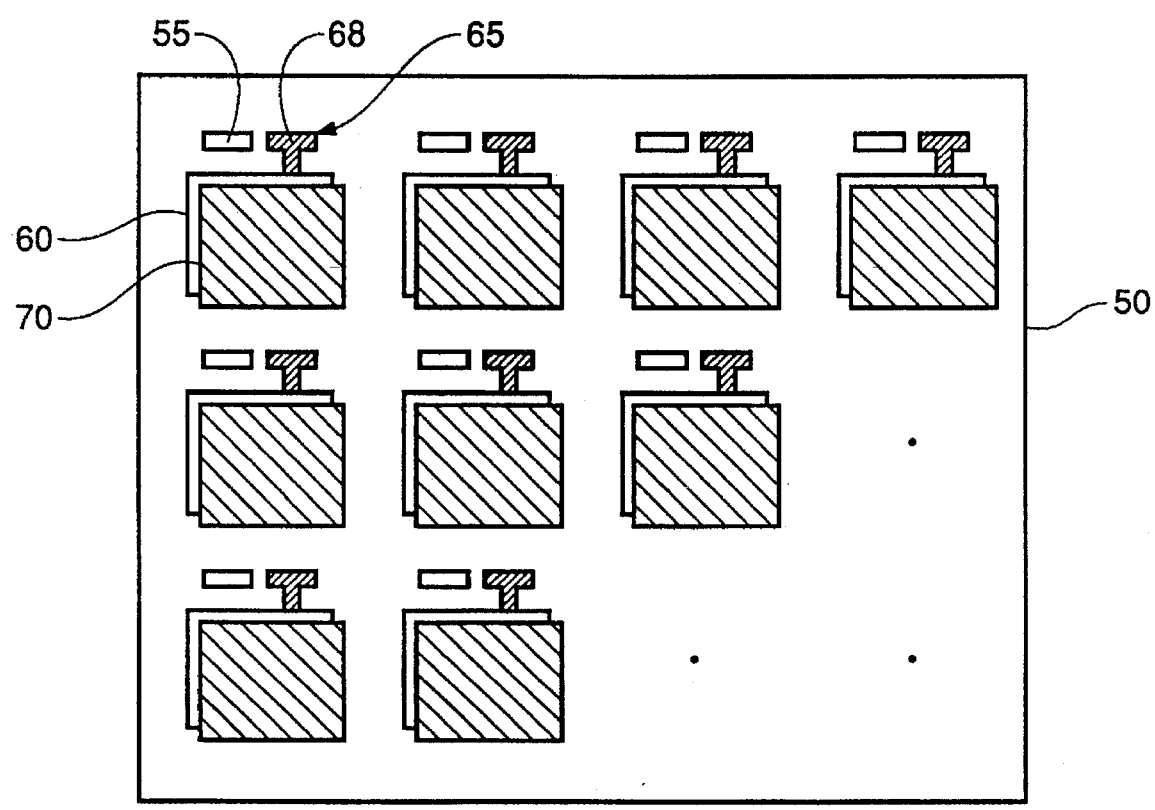

Referring to FIG. 3(e), an anode 70 is formed superjacent second conductive layer 60. Anode 70 comprises an alkali metal, preferably lithium. Anode 70 is fabricated superjacent second conductive layer 60 by fusing the alkali metal, in molten form, to second conductive layer 60. A variety of techniques for this fusing step are known to one of ordinary skill in the art, and as such, are not described in detail. By fusing the molten alkali metal to second conductive layer 60 to form anode 70, second base 50 of the battery cell is complete.

Figure 4:
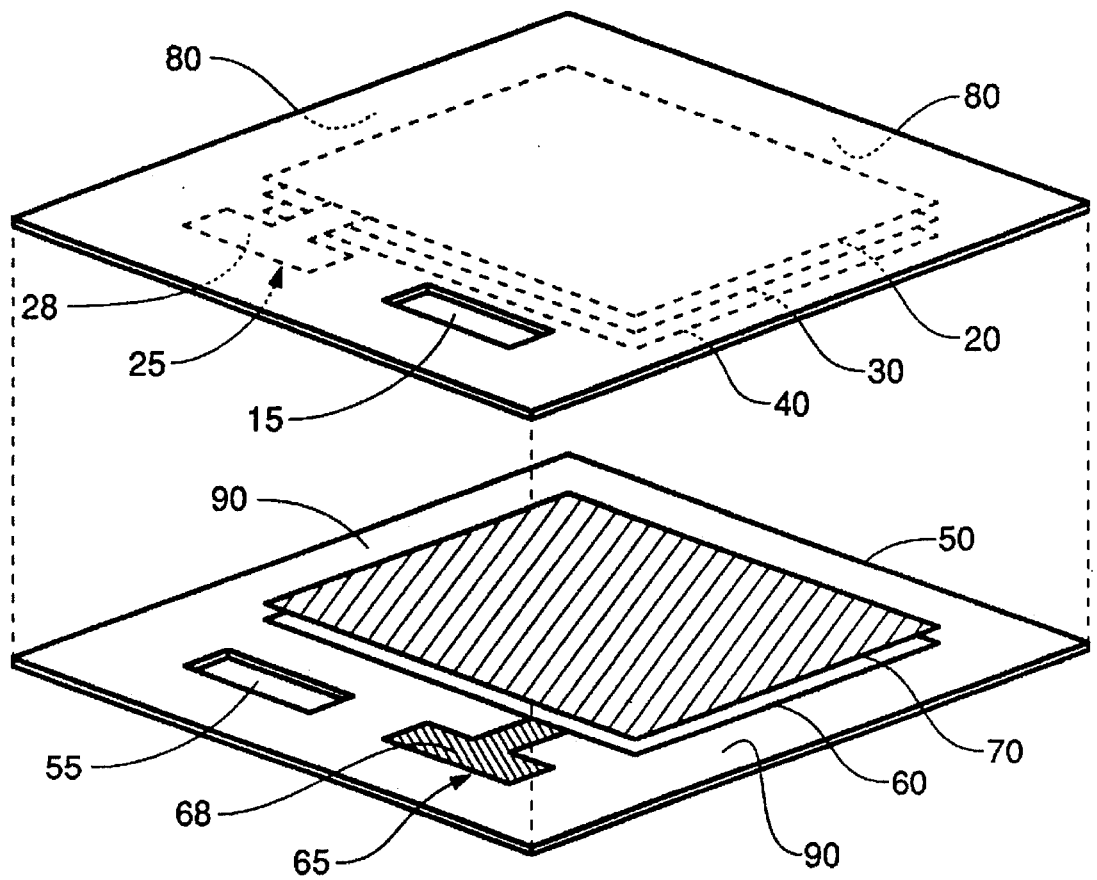
FIG. 4 is a three dimensional view of both the first and second bases prior to assembly of the battery cell.

Referring to FIG. 4, a three dimensional view is provided of first base 10 and second base 50 prior to completion of the present inventive method. As illustrated, first base 10, now turned upside down, resembles a first sandwich comprising first conductive layer 20, cathode 30, and electrolyte layer 40 subjacent first base 10. First pad 25 having capped tip 28 is in electrical contact with first conductive layer 20. First pad 25 is symmetrically arranged beside first slot 15 and over slot 55.

Similarly, second base 50 resembles a second sandwich comprising second conductive layer 60—and anode 70 superjacent second base 50. Second pad 65 having capped tip 68 is in electrical contact with second conductive layer 60. Second pad 65 is symmetrically arranged beside second slot 55 and over slot 15

Figure 5:
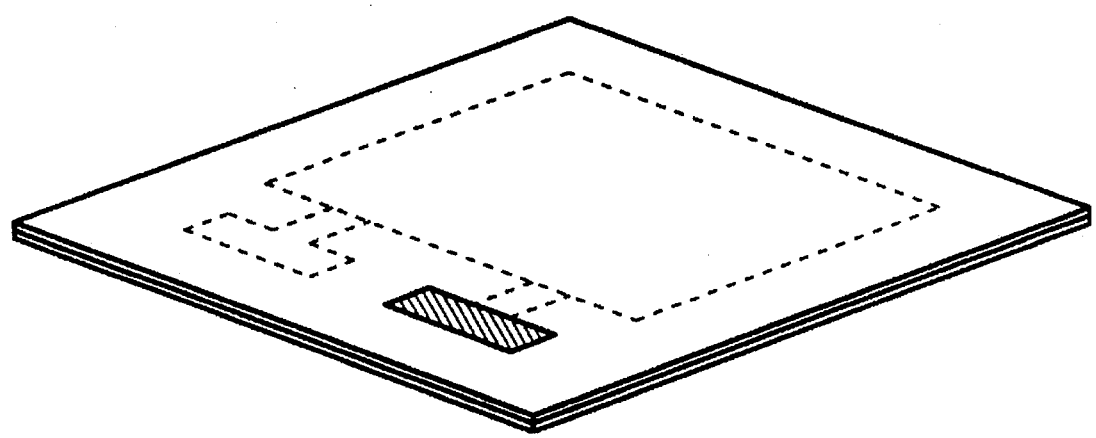
FIG. 5 is a three dimensional view of an assembled battery cell at the present invention.

Surrounding both the first sandwich and the second sandwich are first area 80 and second area 90. It is in these areas where adhesive material is positioned for joining first base 10 and second base 50. Prior to adjoining these bases, however, first base 10 and second base 50 are physically associated such that second slot 55 is properly aligned with first pad 25 and its capped tip 28, and first slot 15 is properly aligned with second pad 65 and its capped tip 68. Thus, by aligning both first base 10 and second base 50 properly, direct electrical contact can be made to anode 70 through second pad 65 and its capped tip 68 without the need for an anode lead. Similarly, direct electrical contact can be made to cathode 30 through first pad 25 and its capped tip 28 without the need for an cathode lead. FIG. 5 illustrates a properly aligned and assembled battery cell according to the present inventive method.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A method of making an anode for a battery, the method comprising the steps of:

providing a nonconductive surface;

forming a conductive layer comprising a polymer superjacent the nonconductive surface; and fusing an alkali metal to the conductive layer.

2. The method of claim 1 wherein the nonconductive surface is a polymer film.

3. The method of claim 1 wherein the step of forming comprises printing with a polymer ink and curing the ink.

4. The method of claim 1 wherein the step of fusing comprises applying molten lithium to the conductive layer.

\* \* \* \* \*

UNITED STATES PATENT AND TRADEMARK OFFICE
CERTIFICATE OF CORRECTION

PATENT NO. : 5,624,468
DATED : April 29, 1997
INVENTOR(S) : Rickie C. Lake

It is certified that error appears in the above-indentified patent and that said Letters Patent is hereby corrected as shown below:

Col. 1, l. 47:   Replace "an" with --a--.
Col. 3, l. 39:   Delete "through one".
Col. 3, l. 40:   Insert --through one-- between "package" and "base".
Col. 4, l. 8:    Replace "at" with --of--.
Col. 4, l. 30:   Replace "device" with --devise--.
Col. 5, l. 9:    Insert --in-- after "shown".
Col. 5, l. 26:   Remove "," after "cathode", and insert --30-- after "cathode".
Col. 5, l. 29:   Replace "a" with --an--.
Col. 6, l. 5:    Add --,-- after "thus". Add --not-- after "are".
Col. 6, l. 35:   Add --in-- after "shown".
Col. 6, l. 39:   Replace "at" with --of--.
Col. 6, l. 67:   Add --.-- after "15".
Col. 7, l. 14:   Replace "an" with --a--.

Signed and Sealed this

Twenty-third Day of September, 1997

*Attest:*

BRUCE LEHMAN

*Attesting Officer*      *Commissioner of Patents and Trademarks*